US008879796B2

(12) United States Patent
Rodriguez Serrano

(10) Patent No.: US 8,879,796 B2
(45) Date of Patent: Nov. 4, 2014

(54) REGION REFOCUSING FOR DATA-DRIVEN OBJECT LOCALIZATION

(75) Inventor: José Antonio Rodriguez Serrano, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 13/592,961

(22) Filed: Aug. 23, 2012

(65) Prior Publication Data

US 2014/0056520 A1 Feb. 27, 2014

(51) Int. Cl.
*G06K 9/00* (2006.01)

(52) U.S. Cl.
USPC .................. 382/105; 382/159; 382/172

(58) Field of Classification Search
USPC ................................ 382/105, 159, 172
See application file for complete search history.

(56) References Cited

U.S. PATENT DOCUMENTS

| | | | | |
|---|---|---|---|---|
| 6,339,651 B1* | 1/2002 | Tian et al. | ...................... | 382/105 |
| 7,068,185 B2* | 6/2006 | Kavner | ...................... | 340/933 |
| 2003/0021481 A1 | 1/2003 | Kasutani | | |
| 2007/0005356 A1 | 1/2007 | Perronnin | | |
| 2007/0258648 A1 | 11/2007 | Perronnin | | |
| 2008/0069456 A1 | 3/2008 | Perronnin | | |
| 2008/0240572 A1 | 10/2008 | Hoshii | | |
| 2008/0317358 A1 | 12/2008 | Bressan et al. | | |
| 2009/0144033 A1 | 6/2009 | Liu et al. | | |
| 2009/0208118 A1 | 8/2009 | Csurka | | |
| 2010/0040285 A1 | 2/2010 | Csurka et al. | | |
| 2010/0082615 A1 | 4/2010 | Clinchant et al. | | |
| 2010/0092084 A1 | 4/2010 | Perronnin et al. | | |
| 2010/0098343 A1 | 4/2010 | Perronnin et al. | | |
| 2010/0189354 A1 | 7/2010 | de Campos et al. | | |
| 2010/0191743 A1 | 7/2010 | Perronnin et al. | | |
| 2010/0226564 A1 | 9/2010 | Marchesotti et al. | | |
| 2010/0318477 A1 | 12/2010 | Perronnin et al. | | |
| 2011/0026831 A1 | 2/2011 | Perronnin et al. | | |
| 2011/0040711 A1 | 2/2011 | Perronnin et al. | | |
| 2011/0052063 A1 | 3/2011 | McAuley et al. | | |
| 2011/0072012 A1 | 3/2011 | Ah-Pine et al. | | |
| 2011/0091105 A1 | 4/2011 | Perronnin | | |
| 2011/0137898 A1 | 6/2011 | Gordo et al. | | |
| 2011/0184950 A1 | 7/2011 | Skaff et al. | | |
| 2012/0045134 A1 | 2/2012 | Perronnin et al. | | |
| 2012/0057756 A1* | 3/2012 | Yoon et al. | ...................... | 382/104 |

(Continued)

OTHER PUBLICATIONS

Chang et al.; "Automatic license plate recognition"; IEEE, vol. 5, No. 1, Mar. 2004 42-53.*

(Continued)

*Primary Examiner* — Chan Park
*Assistant Examiner* — Eueng-Nan Yeh
(74) *Attorney, Agent, or Firm* — Fay Sharpe LLP

(57) ABSTRACT

A system and method are provided for segmenting an image. The method includes computing an image signature for an input image. One or more similar images are identified from a first set of images, based on the image signature of the input image and image signatures of images in the first set of images. The similar image or images are used to define a cropped region of the input image and a second image signature is computed, this time for the cropped region. One or more similar images are identified from a second set of images, based on the cropped image signature and the image signatures of images in the second set of images. The input image is segmented based on a segmentation map of at least one of the similar images identified in the second set of images.

25 Claims, 5 Drawing Sheets

(56) References Cited

U.S. PATENT DOCUMENTS

2012/0076401 A1 3/2012 Sanchez et al.
2012/0106781 A1 5/2012 Kozitsky et al.
2012/0143853 A1 6/2012 Gordo et al.
2012/0158739 A1 6/2012 Ah-Pine et al.

OTHER PUBLICATIONS

Bala et al.; "Image simulation for automatic license plate recognition"; Visual Information Processiing and Communication III, vol. 8305, Jan. 22, 2012.*

Alves, et al. "Text localization in scene images by morphological filters", SIBGRAPI 2009, p. 1-2, (Earlier than this application Aug. 2012).

Nguyen, et al. "Tensor voting based text localization in natural scene images", IEEE Signal Processing Letters, Jul. 2010, 17, pp. 639-642.

Comelli, et al. "Optical recognition of motor vehicle license plate" IEEE Trans. on VT, 44, Nov. 1995, p. 790-799.

Epshtein, et al. "Detecting text in natural scenes with stroke width transform", CVPR 2010, p. 2963-2970, (Earlier than this application Aug. 2012).

Bottou, L. "Stochastic Learning", Advanced lectures on Machine Learning, LNAI 3176, p. 146-168, 2003 (Earlier than this application Aug. 2012).

Lowe. "Distinctive image features from scale-invariant keypoints" IJCV vol. 60, 2004, p. 1-28, (Earlier than this application Aug. 2012).

Perronnin, et al. "Fisher kernels on visual vocabularies for image categorization" CVPR 2007, p. 1-8, (Earlier than this application Aug. 2012).

Perronnin, et al. "Improving the fisher kernel for large-scale image classification". Proc. $11^{th}$ European Conf. on Computer Vision (ECCV) Part IV, 2010, p. 143-156, (Earlier than this application Aug. 2012).

Sanchez, et al. "High-dimensional signature compression for large-scale image classification" CVPR, 2011, pp. 1665-1672, (Earlier than this application Aug. 2012).

U.S. Appl. No. 13/224,373, filed Sep. 2, 2011, Serrano, et al.
U.S. Appl. No. 13/300,124, filed Nov. 18, 2011, Serrano, et al.
U.S. Appl. No. 13/441,294, filed Apr. 6, 2012, Bernal, et al.
U.S. Appl. No. 13/461,191, filed May 1, 2012, Wang, et al.
U.S. Appl. No. 13/464,357, filed May 4, 2012, Fan, et al.
U.S. Appl. No. 13/494,302, filed Jun. 12, 2012, Fan, et al.
U.S. Appl. No. 13/351,038, filed Jan. 16, 2012, Serrano.

Russell, et al. "Object Recognition by Scene Alignment", NIPS, 2007, pp. 1-8, (Earlier than this application Aug. 2012).

Liu, et al. "Nonparametric Scene parsing: Label Transfer via Dense Scene Alignment", CVPR 2009, pp. 1972-1979, (Earlier than this application Aug. 2012).

* cited by examiner

US 8,879,796 B2

REGION REFOCUSING FOR DATA-DRIVEN OBJECT LOCALIZATION

BACKGROUND

The exemplary embodiment relates to object localization and finds particular application in connection with a system and method which uses segmentation information from similar images to localize a target object region and to segment a selected image.

Object localization (OL) relates to determining the location of a target object in an image. Image segmentation approaches have been developed for locating specific types of objects in photographic images. For example, photographs of vehicles may be subjected to segmentation techniques to identify the region of the image which corresponds to a license plate. OCR techniques may then be applied to this region to identify the license number or to see if it matches another license plate.

Existing segmentation techniques are based on heuristics which exploit the a priori known characteristics of the object to be segmented, such as characteristics of text. For example, some exploit the frequent presence of horizontal and vertical edges. See, for example, Wonder Alves, et al., "Text localization in scene images by morphological filters," in SIBGRAPI, 2009, and Toan Dinh Nguyen, et al., "Tensor voting based text localization in natural scene images," *IEEE Signal Processing Letters*, 17, July 2010. Others rely on high local contrast or constant stroke width. See, for example, Paolo Comelli, et al., "Optical recognition of motor vehicle license plates." *IEEE Trans. on VT*, 44, November 1995; Boris Epshtein, et al., "Detecting text in natural scenes with stroke width transform," in *CVPR*, pages 2963-2970, 2010. These techniques have rather narrow applicability, since the prior knowledge of the images of interest is incorporated into the software, and therefore such methods do not generalize well to other segmentation tasks.

One approach for data-driven object localization (DDOL) is described in copending application Ser. No. 13/351,038, filed on Jan. 16, 2012, entitled IMAGE SEGMENTATION BASED ON APPROXIMATION OF SEGMENTATION SIMILARITY, by José Antonio Rodriguez Serrano (hereinafter, "the '038 application"), the disclosure of which is incorporated herein by reference in its entirety. As described therein, the object location for an image is determined by first computing the similarity between the image and each of a set of database images in which a similar object of interest has been localized, and then transferring the location information of the object in the most similar image to the input image or combining the locations for the top-k most similar images. In the case of license plates, for example, the method is able to yield a high accuracy when the database images are small (~200 pixels wide), the target text region occupies a significant portion of the image, and the text region is biased to be near the center of the image.

It would be desirable to be able to apply the DDOL approach to more complex localization situations, such as locating the license plate given an image of an entire vehicle. Here, the object of interest only occupies a relatively small region of the image. The exemplary embodiment provides a two-stage method of object localization which is particularly useful for such situations.

INCORPORATION BY REFERENCE

The following references, the disclosures of which are incorporated herein by reference in their entireties, are mentioned:

U.S. Pub. No. 20100226564, entitled FRAMEWORK FOR IMAGE THUMBNAILING BASED ON VISUAL SIMILARITY, by Luca Marchesotti, et al.

U.S. Pub. No. 20120106781, published May 3, 2012, entitled SIGNATURE BASED DRIVE-THROUGH ORDER TRACKING SYSTEM AND METHOD, by Vladimir Kozitsky, et al.

U.S. Pub. No. 20120143853, published on Jun. 7, 2012, entitled LARGE-SCALE ASYMMETRIC COMPARISON COMPUTATION FOR BINARY EMBEDDINGS, by Albert Gordo, et al.

U.S. application Ser. No. 13/224,373, filed on Sep. 2, 2011, entitled TEXT-BASED SEARCHING OF IMAGE DATA, by José Antonio Rodriguez Serrano, et al.

U.S. application Ser. No. 13/300,124, filed on Nov. 18, 2011, entitled METHODS AND SYSTEMS FOR IMPROVED LICENSE PLATE SIGNATURE MATCHING BY SIMILARITY LEARNING ON SYNTHETIC IMAGES, by José Antonio Rodriguez Serrano, et al.

U.S. application Ser. No. 13/441,294, filed on Apr. 6, 2012, entitled VIDEO-BASED DETECTOR AND NOTIFIER FOR SHORT-TERM PARKING VIOLATION ENFORCEMENT, by Edgar Bernal, et al.

U.S. application Ser. No. 13/461,191, filed on May 1, 2012, entitled A SYSTEM AND METHOD FOR STREET-PARKING VEHICLE IDENTIFICATION THROUGH LICENSE PLATE CAPTURING, by Yao Rong Wang, et al.

U.S. application Ser. No. 13/464,357, filed on May 4, 2012, entitled LICENSE PLATE CHARACTER SEGMENTATION USING LIKELIHOOD MAXIMIZATION, by Zhigang Fan, et al.

U.S. application Ser. No. 13/494,302, filed on Jun. 12, 2012, entitled GEOMETRIC PRE-CORRECTION FOR AUTOMATIC LICENSE PLATE RECOGNITION, by Zhigang Fan, et al.

BRIEF DESCRIPTION

In accordance with one aspect of the exemplary embodiment, a method for segmenting an image includes computing a first image signature for an input image and identifying at least one similar image from a first set of images, based on the first image signature and image signatures of images in the first set of images. A cropped region of the input image is generated, based on the identified at least one similar images. A second image signature for the cropped region is computed and at least one similar image is identified from a second set of images, based on the second image signature and image signatures of images in the second set of images. The input image is segmented, based on a segmentation map of at least one of the at least one similar images in the second set of images.

In accordance with another aspect, a system for image segmentation includes memory which stores a signature generator configured for generating a first image signature for an input image to be segmented and a second image signature for a cropped region of the input image. A retrieval component is configured for identifying at least one first similar image from an associated first set of images, based on the first image signature and image signatures of images in the first set of images. A segmentation component is configured for identifying a segmented region of the input image, based on a segmentation map of the identified at least one similar image from the first set. A cropping component is configured for cropping the input image to generate the cropped region, based on the identified segmented region. The retrieval component is also configured for identifying at least one second similar image from an associated second set of images, based on the second image signature and image signatures of images in the second set of images. The segmentation component is also configured for segmenting the input image based on segmentation maps of the identified at least one second similar image from the second set. A processor implements the signature generator, retrieval component, cropping component, and segmentation component.

In accordance with another aspect, a method for forming a system for image segmentation includes providing a signature generator for generating a first image signature for an input image to be segmented and a second image signature for a cropped region of the input image. A first projection matrix for projecting the first image signature into a first feature space is learned, using image signatures of images drawn from a first training set and their respective segmentation maps. A second projection matrix for projecting the second image signature into a second feature space is learned, using image signatures of images drawn from a second training set and their respective segmentation maps. A retrieval component is provided for identifying at least one similar first image from the first set of images, similarity being computed based on the projected image signature of the input image and the projected image signatures of the images in the first set of images, the projected image signature of the input image being generated by projecting the input image's image signature with the projection matrix, and for identifying at least one similar second image from the second set of images, similarity being computed based on the projected image signature of the cropped region and the projected image signatures of the images in the second set of images. The projected image signature of the cropped region is generated by projecting the cropped region's image signature with the projection matrix. The cropped region is generated based on the segmentation map of the identified at least one similar first image. A segmentation component is provided for segmenting the input image based on a segmentation map of at least one of the at least one similar second images.

In accordance with another aspect, a method for image segmentation includes, with a computer processor, cropping an input image to generate a cropped region of the input image, based on a computed similarity between a representation of the input image and representations of images in a first set of images for which respective segmentation maps are defined. A target region is identified within the cropped region, based on a computed similarity between a representation of the cropped region and representations of images in a second set of images for which respective segmentation maps are defined. Images in the second set are each derived from a respective image in the first set by cropping.

DETAILED DESCRIPTION

Aspects of the exemplary embodiment relate to a system and method for localizing a target object in an image by segmenting the image into a plurality of regions based on a multidimensional global representation of the image (an image "signature") and segmentation information for one or more similar images in a collection of images. The exemplary method uses the similarity of the image representations to identify the one or more similar images in the collection and repeats the process for a small refocused ("cropped") region of the image, identified based on the similar images' segmentation information.

Figure 1:
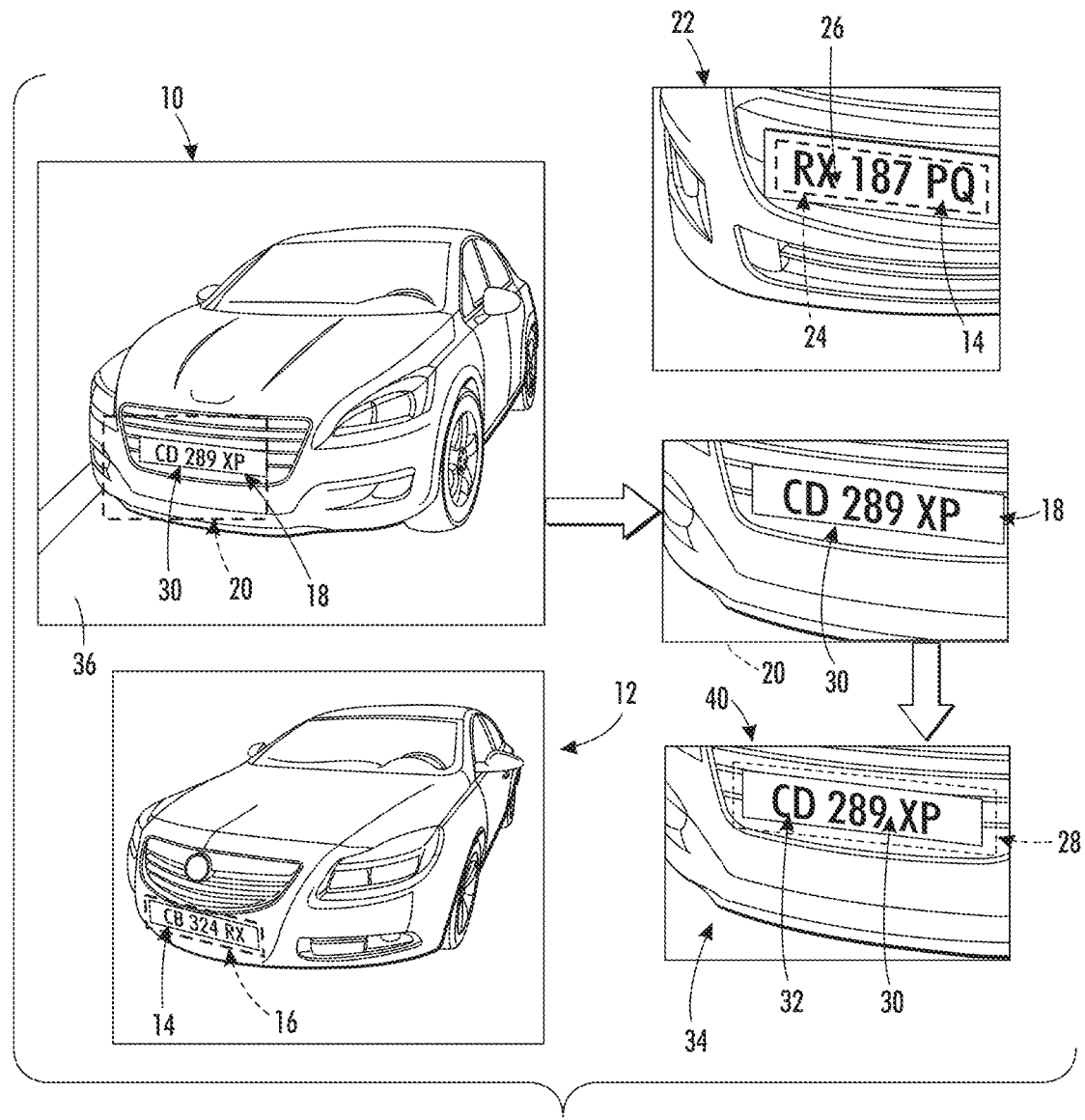
FIG. 1 graphically illustrates localization of an object of interest (license plate) in an image using small and large segmented images.

As illustrated graphically in FIG. 1, the exemplary method proceeds in two stages: a coarse segmentation and a finer segmentation. First, for a query image 10 to be segmented, a set of the most similar images 12 in a first collection of labeled, "large" images is identified. Each of these large images 12 is associated with segmentation information in the form of a segmentation map which identifies the location of an object of interest 14 (e.g., as a ground-truth rectangle). In FIG. 1, the segmentation map is illustrated by a bounding box 16 which surrounds the object 14 of interest in the image 12. Each image 12 may include a single object 14 of interest only. Based on the segmentation maps of the similar large image(s) 12, a cropped region 18 in the image 10 to be segmented is identified. The cropped region 18 is a region of the query image 10 bounded by a bounding box 20 in which the query image's own object of interest (target object) is expected to be located. The illustrated bounding box 20 is a rectangle, although other shapes are contemplated, such as regular or irregular polygons, a circle, or the like. The cropped region 18 is thus a rough estimate of the probable location of the target object in the query image. The cropped region 18 encompasses fewer than all of the pixels of the input image.

In a second, region refocusing stage, the segmentation process is repeated using the cropped region 18 as the query image. In this stage, a set of the most similar "small" images 22 (cropped regions) is retrieved from a second collection, which are similar to the cropped region 18. "Large" and "small" here refer to the relative size of the image to the object 14, the small images being more focused on the object of interest 14 and thus the object of interest occupies a larger proportion of the image in the small images 22 than in the large images 12. Each of the similar small images 22 in the second collection is associated with a segmentation map which identifies the location of the respective object of interest (e.g., as a ground-truth rectangle). In FIG. 1, the segmentation map for the small image 22 is illustrated by a bounding box 24 which surrounds a foreground region 26 that includes the object 14 of interest. The small image segmentation maps 24 are collectively used to identify a bounding box 28 within the cropped region 18 which is expected to contain the target object 30. Thus, in the second stage, for the cropped region 18, the most similar images 22 in the second collection of cropped regions are identified to yield the "fine" location of the target object 30, thus segmenting the cropped region 18 into a first, target region 32, which is expected to contain the target object 30, and a second, background region 34, which is expected not to contain the target object, i.e., which is assigned a lower probability of containing the target object 30 than the target region 32. The two regions 32, 34 thus make up the cropped region 18. The exemplary method aims to extract a target region 32 defined by a bounding box 28 which is approximately the same size and in the same location as the target object 30. The two stages may each proceed in a similar manner to the method described in the '038 application.

The image 10 may be larger than those typically used in the '038 application, for example, each may be at least 400 or at least 600 pixels wide, such as about 800 pixels wide, visually more complex, and the target object 30 generally occupies only a small region 32 of the image 10, within a sizeable second, background region 36. This is also the case for the large labeled images 12. The cropped region 18 and small images 22 may be closer in size to the images typically used in the '038 application.

The regions 32, 34, of a segmented cropped region 18, or location information extracted therefrom, can be considered as the query image's segmentation map 40. Alternatively, the region 32 is located on the original image 10, using the localization of the cropped region 18 in the original image 10 and the location of the region in the cropped region.

In various aspects, the target object 30 is a license plate, or at least a region of the license plate, which includes textual information. The objects of interest 14 in the images 12, 22 are thus also license plates. The query image 10, in this case, is generally an image of an entire vehicle, or a substantial portion thereof. The target object 30 thus occupies a relatively small portion of the area of the query image 10, such as less than 10% or less than 5% of the area (or the number of pixels) of the image 10. This is also the case for the object of interest 14 in each of the labeled large images 12.

Each region 32, 34 of the segmented cropped image 18 is formed by a set of contiguous pixels, which can be labeled with a label to indicate the predicted semantic class of the region. More particularly, a segmentation map may specify a set of parameters which specify the location of the bounding box 28, for example by identifying x,y coordinates of one or more corners of the bounding box with respect to the image 10, 18 in which it is located, e.g., the coordinates of opposed corners, such as top left and bottom right corners, in the case of a rectangle. However, the method is independent of this particular choice and generalizes to other representations. Other methods of defining the location are also contemplated, such as the coordinates of four corners of a 4-sided polygon, or the coordinates of only one corner and a degree of skew, in the case of a rectangle of predetermined, known height and width (e.g., expressed in terms of number of pixels or other unit of measurement such as inches or centimeters), or the coordinates of the center, in the case of a circle.

Figure 2:
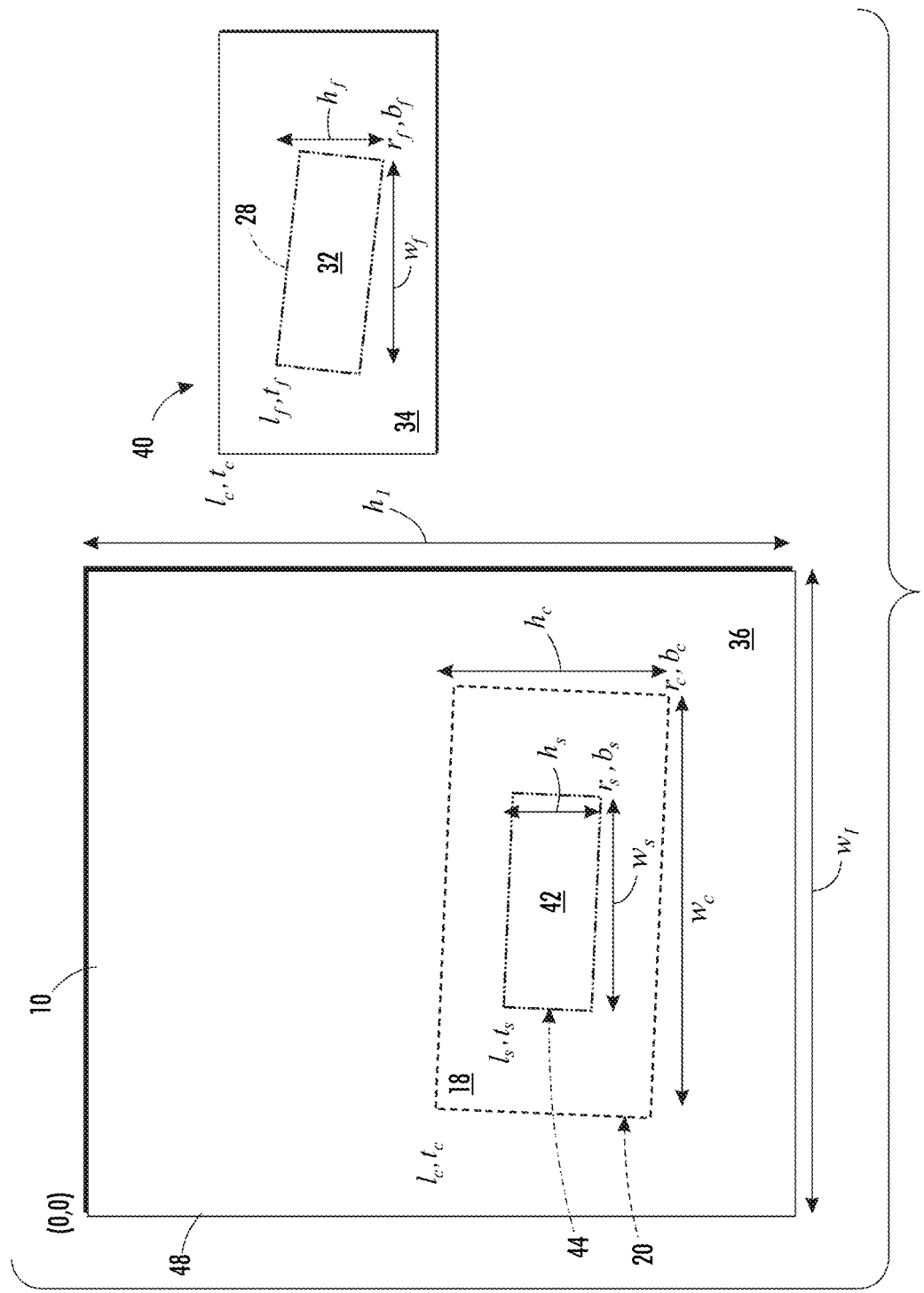
FIG. 2 illustrates notations used for identifying bounding boxes in segmented images.

In one embodiment, segmented/cropped regions of the various images may be considered as rectangles of the form $R=(l, t, r, b)$, where $(l, t)$ and $(r, b)$ denote the horizontal and vertical coordinates of the top-left and bottom-right vertices. As illustrated in FIG. 2, the query image 10 has a width $w_1$ and a height $h_1$ in orthogonal directions (labeled x and y, respectively) The cropped region 18 has a height $h_c$ and width $w_c$ and top left and bottom right coordinates $l_c$, $t_c$ and $r_c$, $b_c$, respectively. In general, $h_1>h_c$ and $w_1>w_c$. For example, $h_1>1.5h_c$, or $>2h_c$, and $w_1>1.5w_c$ or $>2w_c$. Put another way, the input image 10 is at least two, three, four, ten, or more times the area (number of pixels) of the cropped region 18.

The cropped region 18 encompasses a preliminary segmented region 42, which is computed based on the segmentation maps of the similar large image(s) 12. The preliminary segmented region 42 may be rectangular in shape, e.g., defined by a rectangular bounding box 44 with a height $h_s$ and width $w_s$ and top left and bottom right coordinates $l_s$, $t_s$ and $r_s$, $b_s$. The segmented region 42 is smaller in size than the cropped region 18, e.g., $h_c>h_s$ and $w_c>w_s$. The segmented region 42 may differ in its location from the final segmented region 32, since region 42 is computed based on the large images 12, with a higher expectation of error.

The target (foreground) region 32 of cropped region 18 has a height $h_f$ and width $w_f$ and top left and bottom right coordinates $l_f$, $t_f$ and $r_f$, $b_f$. The coordinates $(l_f, t_f, r_f, b_f)$ with respect to the image top left corner (0,0), or with respect to the cropped image top left vertex $(l_c, t_c)$ may be considered as the segmentation map 40 for the image 10, or may be subjected to further processing to further refine the segmentation map, for example, by repeating stage two, using smaller (more focused) images than images 22. As illustrated in FIG. 2, the rectangles may be angled to, rather than aligned with, the horizontal direction, although in other embodiments, the rectangles 16, 20, 24, 28, 44 may be constrained to be horizontally (and vertically) aligned.

The width and height of each rectangle 16, 20, 24, 28, 44, may be expressed in pixels, respectively, e.g., computed as $w=r-l+1$, and $h=b-t+1$.

The cropped region 18 may be generated by upscaling (increasing) each dimension of the segmented region rectangle 44 by a predetermined factor to enlarge the rectangle while maintaining its geometric center in approximately the same location. In the case where the rectangle 44 is close to the border 48 of the image, the geometric center of the cropped region rectangle 20 may be offset from that of rectangle 44 to ensure that it remains within the border of the query image 10.

For example, the upscaling may be performed by shifting the horizontal and vertical coordinates of the rectangle 44 in proportion to the rectangle's respective width or height, respectively, e.g., using a scaling factor:

$l_c = l_s - w_s x_1$
$t_c = t_s - h_s y_1$
$r_c = r_s + w_s x_2$
$b_c = b_s + h_s y_2$ where $x_1$ and $x_2$ are horizontal scaling factors and $y_1$ and $y_2$ are vertical scaling factors. In the exemplary embodiment, $x_1 = x_2$ and $y_1 = y_2$ In general the scaling factors are each greater than 0 such that $h_c>h_s$ and $w_c>w_s$. For example, $h_c>1.2h_s$ and $w_c>1.2w_s$. For example, $h_c \geq 1.3h_s$ or $\geq 1.5h_s$ and $w_c \geq 1.3w_s$ or $\geq 1.5w_s$. Put another way, the area of the rectangle 20 may be at least 1.5 times, or at least 2 times, or at least 4 times, or at least 6 times the area of rectangle 44, such as up to 10 times the area, and entirely contain it. The scaling factors may be different for x and y directions, for example, $x_1 = x_2 > 0.1$ or $>0.2$, e.g., about 0.5 and $y_1 = y_2 > 0.2$, e.g., $>0.5$, e.g., about 1. This is suited to cases where $w_s>h_s$, e.g., when $w_s \geq 1.5 h_s$ as is the case when the target object is a license plate. In other cases, different scaling factors may be used. For example, in some embodiments, $x_1 = x_2 = y_1 = y_2$. The ratio of h/w may thus be the same for both rectangles. Rectangles 24 may have the same pixel dimensions as rectangles 14 (and 44).

In the case of the images 12, 22, the bounding box 16, 24 may not tightly fit the object of interest 14 (e.g., a license plate), but a constraint may be made that it can be no more than twice (or other predetermined scale factor) the size of the object of interest.

Figure 3:
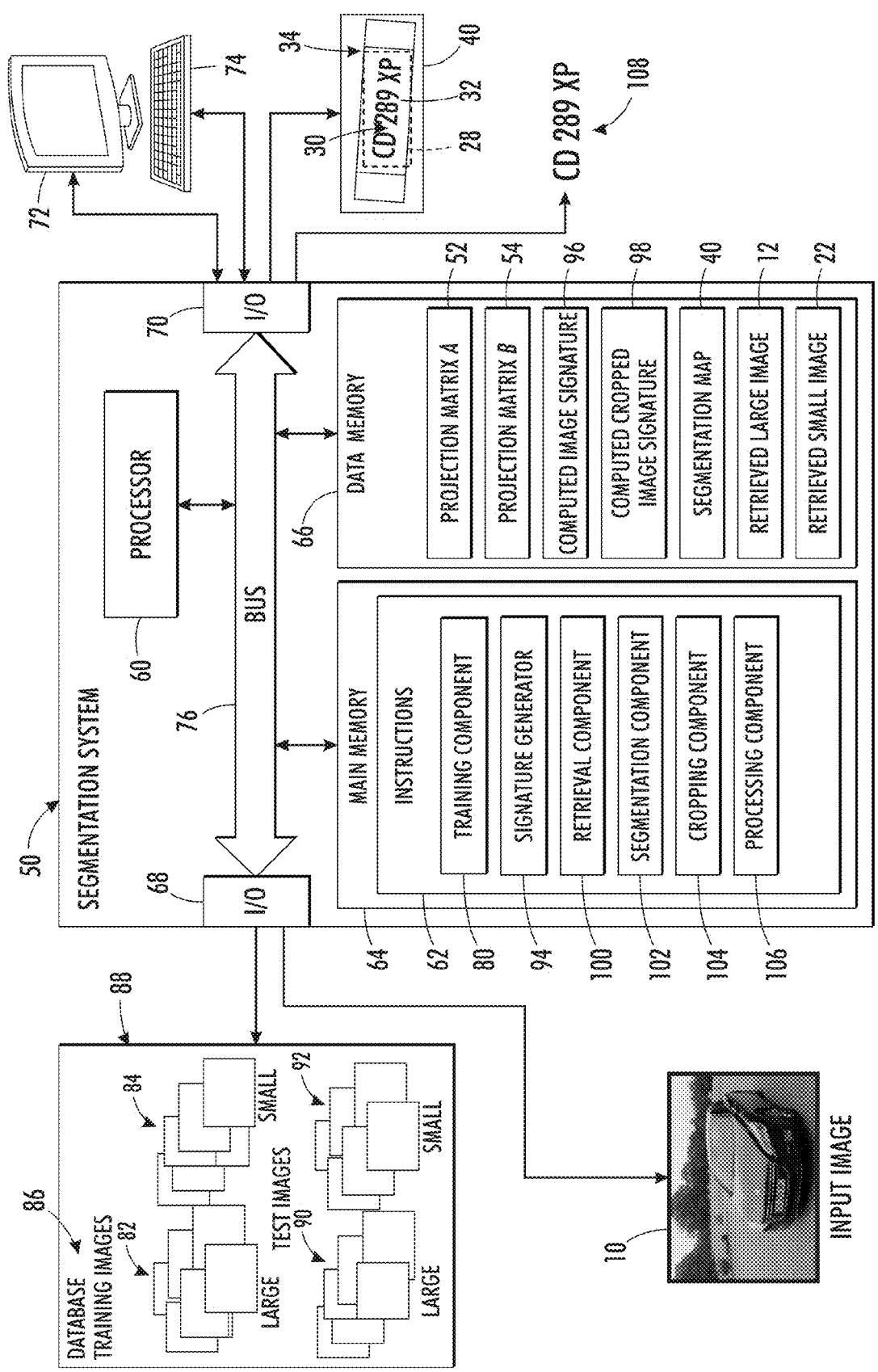
FIG. 3 is a functional block diagram of a system for object localization (segmentation) in accordance with one aspect of the exemplary embodiment.

With reference to FIG. 3, a functional block diagram of a computer-implemented system 50 is shown for performing the method of segmenting images 10 in the manner described above with respect to FIGS. 1 and 2, and in further detail below, with respect to FIGS. 4 and 5. For identifying the similar images 12, 22, the illustrated system 50 optionally learns projection matrices 52, 54, one for each stage in the method, e.g., in the manner described in the '038 application.

The matrices are used for embedding representations of the images 10, 12, and 18, 22 in an appropriate multidimensional space in which a similarity measure for the representations correlates better with the similarity of the ground truth segmentation maps. However, it is to be appreciated that the projection learning could be performed by a separate computing device or that one or both stages of the method may be performed without a projection matrix. The computer system 50 is capable of receiving an input query image 10, cropping the image to identify a cropped region 18 of the image 10, and segmenting the cropped region 18 into two (or more) segmented regions 32, 34 (illustrated as a license plate target region and a shaded, background region).

Figure 4:
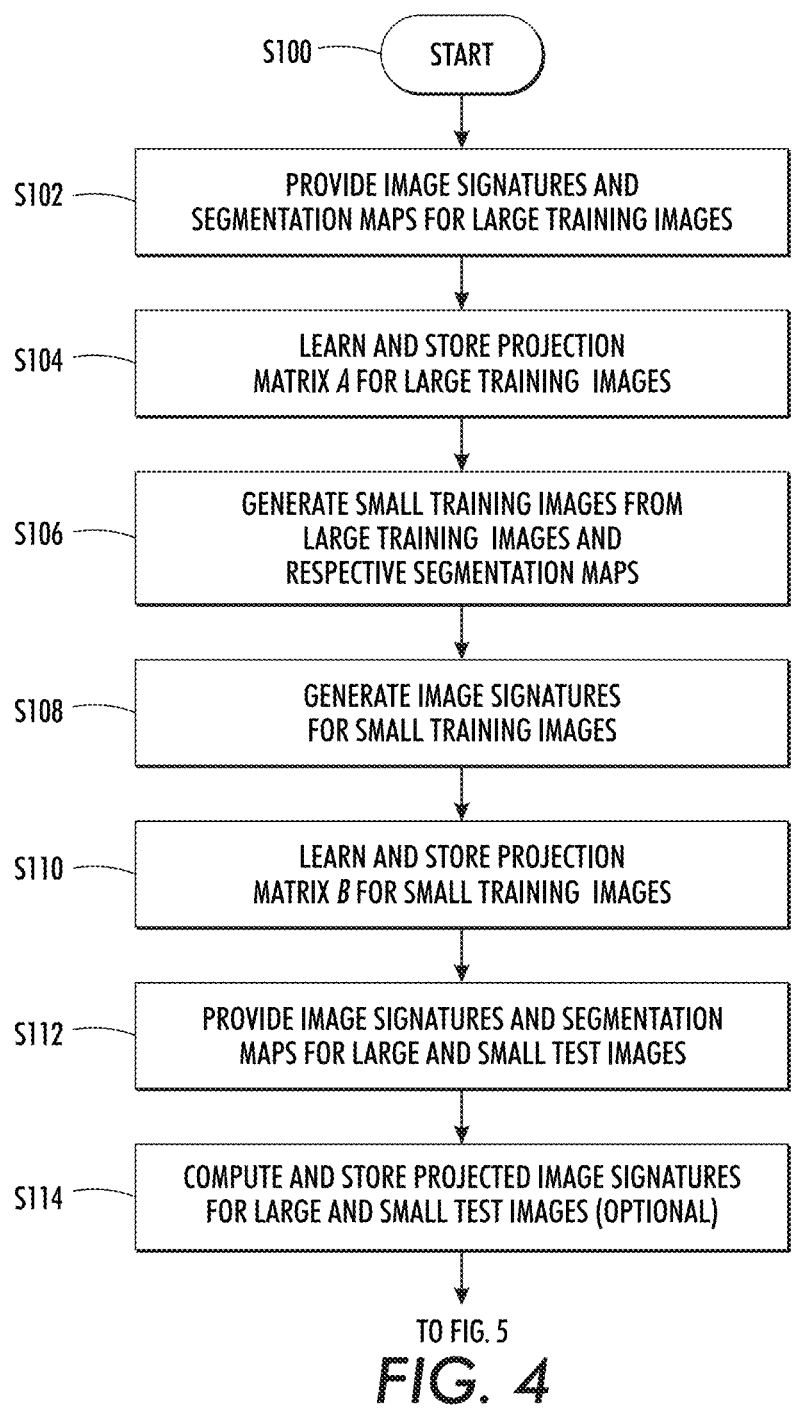
FIG. 4 is a flow chart illustrating a method for generating a system for object localization in accordance with another aspect of the exemplary embodiment.
Figure 5:
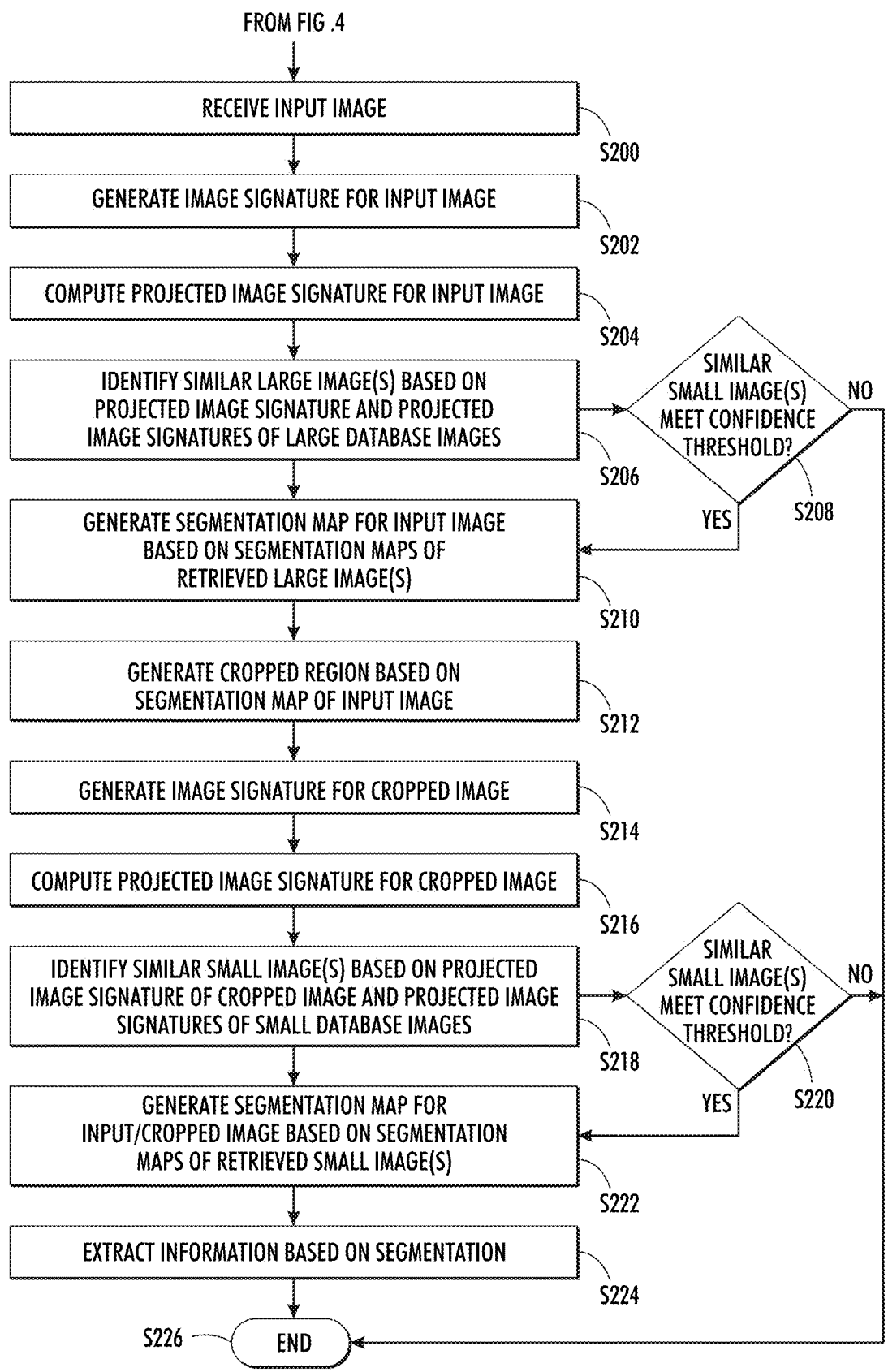
FIG. 5 is a flow chart illustrating a method for object localization in accordance with another aspect of the exemplary embodiment.

The illustrated system 50 includes a processor 60, which implements at least a part of the method shown in FIGS. 4 and 5 by execution of software processing instructions 62 which are stored in non-transitory memory of the system, such as main memory 64, which is communicatively connected to the processor 60. Processor 60 may also control the overall operation of the computer system 50 by execution of instructions stored in main memory 64. Data memory 66, which may be separate from or integral with main memory 64, stores the input image 10 during processing. Computer system 50 also includes one or more input/output interfaces 68, 70 for communicating with external devices and/or external memory. The interface 68 is configured for receiving the image 10 and may include a modem linked to a wired or wireless network, such as a local area network or wide area network, such as the Internet, a portable memory receiving component, such as a USB port, disk drive, or the like. The interface 70 may communicate with one or more of a display device 72, for displaying information to users, speakers, and a user input device 74, such as a keyboard or touch or writable screen, and/or a cursor control device, such as mouse, trackball, or the like, for inputting text and for communicating user input information and command selections to the processor 60. The various hardware components 60, 64, 66, 68, 70, 72, 74 of the system 50 may be all connected by a bus 76.

The exemplary instructions 62 include a training component 80 which learns the first and second projection matrices A and B (52, 54). The projection matrices are used to embed image representations (signatures) in the form of multidimensional vectors in a new space in which the computed similarity between image signatures leads to the identification of images that provide an improved localization of the respective segmented region 42 (and hence cropped region 18) or target region 32. The learning is based on a set of training samples, or more particularly, based on an image signature (generally, only one per training image) and a corresponding segmentation map for each image in first and second sets 82, 84 of segmented training images. The training images 82, 84 (or their image signatures) may be stored in local memory 64, 66 or in a remote database 86 hosted by a memory storage device 88, as illustrated. The training images 82 are large images, as discussed for images 12, and thus similar in content to the image 10 to be segmented. For example, in the case of license plate localization, images 82 may include images of cars in which a license plate has been manually identified by its localization information R. Projection matrix A is learned using only the image signatures and corresponding segmentation maps for the large images in the first set 82 of training images.

The training images 84 are small images, as discussed for images 22, and similar in content to the cropped image 18. For example, in the case of license plate localization, images 84 may include images of parts of cars in which a license plate has been manually identified by its localization information R. In some embodiments, the small images 84 may each be extracted from a respective large image in set 82 by cropping a region around the respective license plate. Projection matrix B is learned using only the image signatures and corresponding segmentation maps for the small images in the second set 84 of training images.

Once the projection matrices A and/or B have been learned, the training component 80 can be omitted from the system 50.

While the exemplary embodiment uses two projection matrices 52, 54, in some embodiments only one projection matrix is learned and is used for both stages. In yet other embodiments, a projection matrix is used in only one of the stages, such as the second stage. In yet other embodiments, no projection matrix is learned.

The database 86 also stores the first and second sets 90, 92 of the large and small images 12, 22, respectively. As will be appreciated, the collections 90, 92 may include some or all of the images in the respective sets 82, 84 of training images, i.e., be at least partially overlapping, although they need not be. In some embodiments, the smaller images 92 may each be extracted from a respective larger image in set 90 by cropping a region around the respective license plate.

A signature generator 94 generates an image signature 96, such as a multidimensional vector, for the input image 10 and an image signature 98, such as a multidimensional vector, for the cropped image 18, and optionally also generates signatures for the training images 82, 84 and database images 90, 92, if their signatures have not been precomputed. The image signatures are computed based on low level features extracted from each image, as described in greater detail below, and in general, are statistical representations of the low level features. As will be appreciated, once the image signatures of the segmented training images 82, 84 have been generated, the original image data is no longer needed.

A retrieval component 100 retrieves one (or more) similar large images 12 from the database collection 90 of large images, in the first stage, based on a computed similarity between image signatures, specifically, between an image signature of the input image 10 and an image signature for each of the images in the set 90. The similarity, in the first stage, may be computed based on a projection of the image signature 96 of the input image 10, and projections of the respective image signatures of the database images in collection 90 into a new multidimensional space. The projections of the respective image signatures are computed by applying the computed projection matrix A 52 to each of the image signatures, or by applying a similarity function in which the projections are automatically incorporated.

The retrieval component 100, or a separate retrieval component, also retrieves one (or more) similar small images 22 from the database collection 92 of small images, in the second stage, based on a computed similarity between image signatures, specifically, an image signature of the cropped image 18 and an image signature for each of the small images in the set 92. The second stage similarity may be computed based on a projection of the image signature 98 of the cropped image 18, and projections of the image signatures of the database smaller images 92 into a new multidimensional space. The projections of the respective image signatures are computed by applying the computed projection matrix B 54 to the image signatures, or by applying a similarity function in which the projections are automatically incorporated.

For convenience, projections of the database images 90, 92 (generated by applying the learned projection matrix A or B, respectively, to their image signatures) may be precomputed and stored in memory, such as memory 66, for use by the retrieval component 100 when a new query image is received.

A segmentation component 102 applies the segmentation map(s) of the retrieved similar larger image(s) 12 to the input image 10 to identify a segmented region 42 for the input image.

A cropping component 104 crops a region 18 of the image around the segmented region 42.

The segmentation component 102, or a separate segmentation component, also applies the segmentation map(s) of the retrieved similar small image(s) 22 to the cropped image 18 to identify a target region 32 for the cropped region 18 and hence for the input image 10. The computed segmentation information is used as the basis for generating the segmented image (or segmented cropped region), in the form of a segmentation map 40.

Optionally, the system 50 includes a processing component 106 for extracting information 108 from the segmented image 10, 18, such as extracting a sequence of characters which form a license number, from the foreground segmented region 32, in the example embodiment. Or, the target region 32 is compared with a target region of another image to determine if they are similar enough to be considered to be the same, which allows a comparison to be made without needing to identify the actual text. Thus, the method may be used for vehicle identification. Application Ser. No. 13/464,357 describes a method for determining a license plate layout in which the exemplary method could be used.

The output of the system 50 may be the segmented image 10 and/or 18, its segmentation map 46, and/or information 106 extracted from the segmented image (e.g., the characters identified in the license plate region 32).

In some embodiments, the segmented image 10, 18 may be input to a further segmentation method. For example, a more computationally expensive segmentation technique, such as a graph-cut method, may be applied to one of the segmented regions, such as the foreground (object) region 32 to refine the segmentation before outputting the segmentation map/processing the image with the processing component 106. In other embodiments, the output of a combination of segmentation techniques, which include the exemplary method, may be used as the basis for segmenting the image.

The computer system 50 may include one or more computing devices, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the segmentation may be performed on a server computer and the results output to a linked client device.

The memory 64, 66, 88 may be separate or combined and may represent any type of non-transitory computer readable medium such as random access memory (RAM), read only memory (ROM), magnetic disk or tape, optical disk, flash memory, or holographic memory. In one embodiment, the memory 64, 66 comprises a combination of random access memory and read only memory. In some embodiments, the processor 60 and memory 64 may be combined in a single chip.

The digital processor 60 is a hardware component and can be variously embodied, such as by a single-core processor, a dual-core processor (or more generally by a multiple-core processor), a digital processor and cooperating math coprocessor, a digital controller, or the like. The exemplary digital processor 60, in addition to controlling the operation of the computer system 50, executes instructions stored in memory 64 for performing the method outlined in FIGS. 1, 4, and/or 5.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 4 illustrates a method for generating the segmentation system 50 in accordance with one aspect of the exemplary embodiment. The method begins at S100.

At S102, a set of image signatures and corresponding segmentation maps is provided for an appropriate set 82 of large training images 12, e.g., images with similar visual content to an image 10 which is to be segmented. In the case of the license plate example, the training images include images which include a vehicle or part of a vehicle and license plate on the vehicle. The image signatures for the images in set 82 may be generated by the signature generator 94. Generally, the segmentation maps are manually or semi-automatically generated. In a manual case, a user may draw a boundary around an object of interest, or identify points on the boundary, and its coordinates are then automatically extracted. The region's location information is stored in memory 88 or 66. In a semi-automatic case, an arbitrary segmentation algorithm is applied to each training image and a user may verify, by visual inspection, that the hypothesized segmented regions are correct and can manually correct erroneous segmentations. In the case of the license plate example, information such as that the foreground region is defined by a four sided polygon and that it includes OCR-recognizable text may be used, together with a manually input observed license plate number.

At S104, a projection matrix A 52 is optionally learned (by the training component 80), based on the set of image signatures and their corresponding segmentation maps for the images in the training set 82. The aim is to find a projection matrix A such that images with similar projected signatures have similar segmentation maps. As described below, the learning step may be an iterative process in which pairs of the projected image signatures are compared in turn and the current projection matrix is updated based on whether the ranking of the pairs, based on the similarity of their projected signatures, is in agreement with a ranking based on the similarity of their segmentation maps. However, other machine learning methods are also contemplated. The final projection matrix A 52 is stored in memory 66.

At S106, a set 84 of small training images 22 is provided. In one embodiment, to generate set 84, a cropped region (sub-image) is generated from every training image in set 82 by applying the same process as described above for generating the cropped region 18, but using the remaining images of the training set 82 as the database and identifying the most similar of these images using a similarity function in which the image signatures of the images are optionally each projected by the learned projection matrix A. For example, for a given training image 12 in set 82, the index i of the nearest image (or set of nearest images) is identified as $i = \mathrm{argmax}_n k(x, x_n)$, where k is a similarity function and x and $x_n$ are the projected signatures of the training image 12 and a remaining training image, respectively. The most similar image(s) is/are used compute a segmentation map defining a segmentation region for the large image 12, which is a function of the segmentation maps of the most similar remaining image(s). The image 22 is then generated by upscaling the segmentation region of the large image 12 using scaling factors as described above for the cropped image 18. The process is repeated for some or all of the images in set 82 to generate set 84. In another embodiment, multiple cropped regions are generated for each training image 12 in set 82, for example by applying a set of different scaling factors or adding horizontal and vertical shifts and/or angles to the horizontal/vertical. Each of these cropped regions can then become a small image 22 in set 84. For each small image 22 in set 84, the segmentation map is generated, using the segmentation map of its source large image 12 and the known location of the small image 22 relative to the respective large image 12.

At S108, an image signature is automatically generated for each of the smaller images 22 in set 84, e.g., by the signature generator 94.

At S110, a projection matrix B 54 is optionally learned automatically (by the training component 80), based on the set of image signatures and their corresponding segmentation maps for small images 22 in the training set 84. The aim is to find a projection matrix B such that small images with similar projected signatures have similar segmentation maps. As described below, the learning step may be an iterative process in which pairs of the projected image signatures are compared in turn and the projection matrix B is updated based on whether the ranking of the pairs, based on the similarity of their projected signatures, is in agreement with a ranking based on the similarity of their segmentation maps. However, other machine learning methods are also contemplated. The final projection matrix B 54 is stored in memory 66.

At S112, a database 94, 96 of segmented test images is provided. This includes a set of image signatures and corresponding segmentation maps for appropriate sets of large and small images, which can be generated as for the training images 82, 84, discussed above. In some embodiments, the same sets of images are used for both the training images and test images 94, 96. In other embodiments, when the sets are not the same, any new large images 12 can be used to generate one or more respective small images 22 using the method described above in S106, but using the same, already learned projection matrix A.

Optionally, at S114, projected image signatures are automatically generated for the large and small test images in sets 94, 96, by applying the respective projection matrix A or B.

This completes the system generation method.

The segmentation method may then proceed as shown in FIG. 5.

At S200, a new image 10 to be segmented is received. The new image may be resized (e.g., scaled and/or cropped) to the same dimensions as the database images 94, e.g., to a fixed number of pixels in x and y directions, for ease of computation.

At S202, an image signature 96 is automatically computed for the input image, by the signature generator 94. In the exemplary embodiment, the image 10 is not among the images 82 used in training, nor among the test images in set 90, although in other embodiments, this situation is not excluded.

At S204, a projected image signature may be automatically computed by applying the projection matrix A 52, learned at S104, to the image signature 96, computed at S202.

At S206, one or more similar large images 12 (nearest neighbor(s)) is/are automatically retrieved from the image database 54 (by the retrieval component 50). This step may include computing a similarity measure (which, for purposes described herein, may include computing a similarity or a dissimilarity (distance) measure). For example, as described for the training images, the index i of the nearest large image 12 (or set of nearest images) in set 90 is identified as i=argmax$_n$ k(x,x$_n$). Function k can be a kernel function, between the projected image signature of the input image 10 and the projected image signatures of the large database images. An exemplary kernel is a linear kernel, such as the dot product, although other similarity measures are also contemplated, such as the L1 distance, chi-squared distance, or the like may be used. The selection of a suitable similarity measure may depend, in part, on the type of signatures used. The choice of similarity measure may also affect the loss function employed in the training step. The projected image signatures of the large database images may have been previously computed using the projection matrix A and stored in memory 66 at S114. Steps S204 and S204 may be combined into a single step in which the similarity function applies the projection matrix to the image signatures. For example, the similarity k between an input image x and a large database image x$_n$ may have the form k(x, x$_n$)=x$^T$A$^T$Ax$_n$, where A is the projection matrix which has been estimated through the similarity learning algorithm (S104) and T represents the transpose of the matrix.

In another embodiment, similarity is computed on the respective image signatures without using a learned projection matrix A. In this method, the similarity function may be computed as the dot product between two image signatures (i.e., of the input image 10 and one of the large images 12).

Optionally, at S208 a test may be automatically performed to determine whether the computed similarity between the (optionally projected) signatures of the image 10 and retrieved large image(s) meet(s) a predetermined confidence threshold on the similarity. If not, the method may end. Otherwise the method proceeds to S210.

At S210, the segmentation map(s) of the similar large database image(s) 12 is/are retrieved and used to estimate a segmentation map for the input image automatically. The retrieved segmentation map of the similar database image 12 can be used directly as the segmentation map in the case of a single segmentation map. In the case of two or more segmentation maps, an average may be computed. A single segmented region 42 of the image is thus identified.

At S212, the segmentation map of the image 10 generated at S210 is used to identify a cropped region 18, by upscaling the coordinates of segmented region 42, as described above. This step may be performed automatically by the cropping component.

In the second stage of the segmentation, steps S202-210 are repeated, using the cropped image 18 as the query image and optionally the projection matrix B.

Specifically, at S214, an image signature 98 is automatically computed for the cropped region 18 of the input image, by signature generator 94.

Optionally, at S216, a projected image signature is automatically computed by applying the projection matrix B 54, learned at S110, to the image signature 98, computed at S214.

At S218, one or more similar small images 22 is/are automatically retrieved from the set 92 (by the retrieval component 100). This step may include computing a similarity (distance) measure (which, for purposes described herein, may include computing a similarity or a dissimilarity measure). For example, the index i of the nearest small image 22 (or set of nearest small images) in set 92 is identified as i=argmax$_n$ k(x,x$_n$) in a similar manner to that discussed for step S206. The projected image signatures of the small database images may have been previously computed using the projection matrix B and stored in memory 66 at S114. Steps S216 and S218 may be combined into a single step in which the similarity function applies the projection matrix B to the respective image signatures. For example, the similarity k between a cropped image x and a small database image $x_n$ may have the form $k(x, x_n) = x^T B^T B x_n$, where B is the projection matrix which has been estimated through the similarity learning algorithm (S110) and T represents the transpose of the matrix.

In another embodiment, similarity is automatically computed on the respective image signatures without using a learned projection matrix B. In this method, the similarity function may be computed as the dot product between two image signatures (i.e., of the cropped image 18 and one of the small images 22).

Optionally, at S220, a test may be automatically performed to determine whether the computed similarity between the (optionally projected) signatures of the cropped image 18 and retrieved small image(s) meet(s) a predetermined confidence threshold on the similarity. If not, the method may end. Otherwise the method proceeds to S222.

At S222, the segmentation map(s) of the retrieved similar small database image(s) 22 is/are used automatically to estimate a segmentation map 40 for the cropped image 18 and/or input image 10. The retrieved segmentation map of the similar small database image 22 can be used directly as the segmentation map in the case of a single segmentation map. In the case of two or more similar images, an optionally weighted average can be automatically computed. Since the coordinates of the cropped image 18 are known with respect to the input image 10, the coordinates of the region 32 in cropped image 18 can be readily expressed as coordinates in the input image 10 to yield the final detection output for the original query image. The segmentation map of the image 10/cropped image 18 generated at S222 may be used as the final segmentation map, or further processing is performed to further refine the segmentation map.

Optionally, at S224, information 108 is automatically extracted from a segmented region 32 of the segmentation map 40, such as a license plate number, e.g., using OCR, or extracts other information.

The method ends at S226.

As will be appreciated, in one embodiment the method may return from S222 to S212 for one or more iterations in which a new cropped image is generated, based on the segmentation map generated in the prior iteration.

The method illustrated in FIG. 4 and/or FIG. 5 may be implemented in a non-transitory computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4 and/or FIG. 5, can be used to implement the exemplary method.

Further details of the system and method will now be described.

Training Data and Database Images

The number of training images may be relatively large, such as at least 1000 or at least 5000 training images in each set 82, 84 and can include up to a million or more images. In general, a larger number of training images can result in a more accurate computation of the projection A and/or B, particularly when the segmentation maps are irregularly shaped. Methods for computation of image signatures are described below. The number of test images may also be relatively large, such as at least 1000 or at least 5000 images in each set 90, 92 and can include any number of images, such as up to a million images or more. The more images in the database sets 90, 92, the more likely it is that similar images are retrieved.

In one exemplary embodiment, the training images 82 and/or test images 90 are all resized (e.g., scaled and/or cropped) to the same dimensions, e.g., a fixed number of pixels in x and y directions, for ease of computation.

Learning the Projection Matrix (S104, S110)

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

The same procedure can be applied for the computation of projection matrix B as for projection matrix A (substituting small images for large images and cropped image for input image), thus for convenience, only the description of the generation of projection matrix A is provided. In another embodiment, the same projection matrix (i.e., learned on large or small images), may be used for both stages of the segmentation method, or a single projection matrix may be jointly learned on a mixture of large and small training images which is used in both stages.

The following notation is introduced for ease of description, bearing in mind that numerals are used for reference in the drawings.

Let $x(I)$ denote a signature extracted from an image I, and let $S(I)$ denote the segmentation map of I, if known. Let $P = \{(x_n, S_n)\}_{n=1}^{N}$ denote a database of N entries, where each entry includes an image signature $x_n = x(I_n)$ and a segmentation map $S_n = S(I_n)$ of an image $I_n$. It may be assumed that each image signature is a D-dimensional vector where each dimension is a real number ($x_n \in \mathbb{R}^D$) and that the segmentation map is drawn from a segmentation map space ($S_n \in S$), where S denotes the segmentation map space). The method does not impose any restrictions on how the segmentation maps are encoded. It is assumed that each segmentation map $S_n$ contains any information from which the segmentation map can be uniquely recovered, for example the indices of the pixels belonging to the foreground (or a particular region), the parameters of any shape that delimits the foreground (or a particular region), or any other data structure by which the segmentation of the image is defined. For example, in the case of license plates, the segmentation maps can be represented by a set of 8 values (4 pairs) which are the x and y coordinates of the four corners of a quadrilateral, or only 4 values, for the opposite corners of a rectangle.

Let $\Psi(S,S')$ denote the similarity between two segmentation maps $S,S'$. Methods for computing the segmentation map similarity are described below.

Given a new signature $x(I)$, the goal is to retrieve entries from the database such that their segmentation map $S_n$ is sufficiently similar to the true segmentation map of I, which can be denoted $\hat{S}=\hat{S}(I)$.

Although similarity between segmentation maps is given by $\Psi(S,S')$, at runtime, the segmentation map $\hat{S}$ of the input image is unknown and only the image signature information is available for the input image. Thus $\Psi(\hat{S},S_n)$ cannot be evaluated directly. In the exemplary embodiment, it is approximated with a similarity between signatures $k(x,x_n)$. In the exemplary embodiment, a similarity measure of the form:

$$k(x,x_n)=x^T A^T A x_n, \quad (1)$$

is used, where A is a L×D matrix and where T denotes the transpose. Sometimes Eqn.(1) is written herein as $k_A(x, x_n)$ to highlight the explicit dependency of $k(\bullet,\bullet)$ on A. As noted above, D is the number of dimensions in each image signature $x(I)$. L is a real number which can be selected to provide acceptable results while providing an acceptable computation time. In one embodiment, L is less than D, i.e., the projected signature will have fewer dimensions than the original image signature. In general, L is greater than 1 and can be at least 10 or at least 100, such as from D/4 to D/64. For example, for image signatures which are vectors having 64×32×32=65,536 dimensions, a suitable value for L may be 4096.

Using samples from the set 82, an optimal value of A that satisfies a desired criterion, such as a loss function, can be estimated.

Note that the similarity defined in Eqn.(1) satisfies the desired efficiency property, since it can be seen as a dot product between the projections Ax and $Ax_n$. As noted, the projection of the database image signatures $Ax_n$ can be precomputed for all the database items (S116), so that in practice, evaluating Eqn. (1) simply involves computing a projection: $(Ax=x^T A^T)$ and a dot product $(Ax \cdot Ax_n)$.

The property sought is that the similarities $k(\bullet,\bullet)$ computed based on Eqn. (1), provide a similar ranking of images 12 in set 82 as does the computed similarity of the segmentation maps $\Psi(\bullet,\bullet)$. Thus for example, the method should provide that the computed similarity of two image projections correlates with the computed similarity of their segmentation maps. One way to favor this ranking similarity is to consider a triplet $(x_i,S_i)$, $(x_j,S_j)$, $(x_m,S_m)$, such that $\Psi(S_i,S_j)>\Psi(S_i,S_m)$, and impose a constraint that:

$$k(x_i,x_j)>K(x_i,x_m)+q \quad (2)$$

where q represents a margin which can be a fixed positive value or a variable. Eq. (2) means that if sample i is more similar to sample j than to sample m in the segmentation map space, then sample i must also be closer to sample j in the projected signature space. In one embodiment, the margin q may have a fixed value, such as 1. In other embodiments, the margin may be a variable which is a function of the similarity between the segmentation maps. For example, q may be proportional to $\|\Psi(S_i,S_j)-\Psi(S_i,S_m)\|$. It has been found, however, that good experimental results can be obtained with a fixed value of q, such as q=1.

As will be appreciated, a variety of machine learning methods can be used to learn the projection matrix A using Eqns. (1) and (2) and the training data. The following section provides details of an example method for the estimation of the projection matrix using a stochastic gradient descent method, which uses a test and update method to gradually refine the projection matrix.

Training with Stochastic Gradient Descent

The signatures and segmentation maps for the set 82 can be used as training data to estimate A. Given this data, the following loss function measures the mismatch of A with respect to the restrictions imposed by Eqn. 2:

$$L(A) = \sum_{\substack{\forall i,j,k \\ s.t. \ \Psi(S_i,S_j)>\Psi(S_i,S_k)}} \max(0, k_A(x_i, x_k) + 1 - k_A(x_i, x_j)). \quad (3)$$

The goal of the training in S104 (and similarly for S110) is to find the projection matrix A that minimizes L(A). Minimization can be achieved by using an iterative process, such as stochastic gradient descent. See, for example, Léon Bottou, "Stochastic learning," in *Advanced Lectures on Machine Learning*, Lecture Notes in Artificial Intelligence, LNAI 3176, pp. 146-168 (Olivier Bousquet and Ulrike von Luxburg, Eds., Springer Verlag, Berlin, 2004). Rather than attempting to optimize the loss function over all possible pairs of entries in the database simultaneously, the gradient descent method takes pairs of entries and determines whether the current projection matrix ranks them correctly, i.e., in the same ranking order as the segmentation map similarity, and if not updates the projection matrix.

The generation of the projection matrix can proceed as follows: The projection matrix is first initialized with a set of values. These can be quite arbitrary. For example, the initial values in the matrix are drawn at random from a normalized distribution with a mean of 0, i.e., the values sum to 0. In other embodiments, the initial values are all the same, or are drawn from a projection matrix previously created for another segmentation task. Next, a triplet of entries is drawn. The triplet can be drawn at random from the training data, or according to any suitable selection algorithm, each entry including a signature and respective segmentation map information. Then, the segmentation similarity of each of the two pairs of entries in the triplet is computed, based on the segmentation maps. A threshold on the similarity may be imposed on the triplets selected, e.g., such that $\Psi(S_i,S_j)>\theta$ and $\Psi(S_i,S_k)<\theta$, where $\theta$ is a threshold on the segmentation similarity. For example, $\theta=0.8$ may be used. If the threshold is not met, the next triplet is drawn. If the threshold is met, the two pairs in the triplet are ranked based on their segmentation similarity. For example, the pair with the highest similarity is ranked highest, e.g., 1, and the other pair is ranked lowest, e.g., 2. Eqn. (1) is then used to compute the similarity of each pair of entries in the triplet, based on their projected signatures, using the current projection matrix. The two pairs are again ranked, this time based on the similarities computed based on their projected signatures.

The two rankings computed based on segmentation maps and projected signatures are compared to see if they agree, which may include evaluating if the constraint in Eqn. 2 is met. If the rankings are the same and Eqn. (2) is satisfied, then the method iterates again, with a new triplet of entries, unless some termination criterion is met, such as a fixed number of iterations have been performed in which case the projection matrix is output. If, however, the two rankings do not agree (the constraint in Eqn. (2) is not met), the projection matrix is updated and the method reiterates with the next triplet.

Thus, if a triplet of entries is ranked in accordance with the ranking of Eqn. (2), the partial loss incurred by the triplet is 0, otherwise a positive cost is paid for ranking incorrectly. In the exemplary method therefore, at each iteration, a random triplet is chosen and the condition in Eqn. 2 is tested. If the inequality is satisfied, the loss is 0, and a new iteration starts. If the inequality is not satisfied, the samples are not correctly ranked and the projection matrix A is updated based on a gradient step. In one example embodiment, when the similarity k is the dot product, the following gradient update may be used for updating A:

$$A \leftarrow A + \lambda A(x_i d^T + dx_i^T), \quad (4)$$

where $d=x_j-x_k$, T represents the transpose, and $\lambda$ is a constant or decreasing learning rate that controls the strength of the update. If $\lambda$ is large, e.g., close to 1, then A is updated more rapidly but the iterations may result in rather wild fluctuations. In one exemplary embodiment, $\lambda$ is a constant and has a value of less than 0.1, such as about 0.01. This updates each of the values in the projection by a small amount as a function of the learning rate and the difference d between the image signatures.

Similarity of Segmentation Maps in Training Phase

The similarity $\Psi(S,S')$ between each pair of the segmentation maps computed in the training phase at S104 and at S110 can be expressed as a function of the area of overlap between the respective labeled regions of interest 16, 24 in the segmentation maps S,S'. The similarity $\Psi T(S,S')$ can be a function of the ratio of an area of the intersection of the two regions of interest to an area of the union of the two regions of interest. The area of overlap can thus be defined as $$\Psi(S, S') = \frac{\text{Area}(S \cap S')}{\text{Area}(S \cup S')}.$$

In other embodiments, it may be satisfactory to consider only the area of intersection as the similarity $\Psi(S,S')$.

In some embodiments, the regions of interest 16, 24 may each be approximated by a polygon having the same number of sides. For example, in images containing license plates as the region of interest, the region may be approximated by the four points of a quadrilateral which bounds the license plate. In other embodiments, another regular shape may be more appropriate as the approximation of the region of interest, such as a circle or oval. It is also contemplated that an image may have two or more regions of interest, in which case, both regions may be aggregated into the image's region of interest, or each region of interest may be considered separately.

In some embodiments, the two segmentation maps S,S' may be preprocessed by the system 50, prior to the overlap computation, so that they both have the same pixel dimensions.

Retrieval of the Similar Images (S206, S218)

Once A and B have been estimated, the similarity k( , ) between projected signatures can be used as a proxy for $\Psi(\cdot,\cdot)$ in order to retrieve the entries from the database 90 or 92 with most similar segmentation maps or maps to an input image 10 or cropped image 18, respectively. Two methods are proposed by way of example:

1. Top-1 Selection

In one embodiment, the index of the most similar segmentation map $n^*=\arg_{max_n} k(x,x_n)$, based on Eqn. (1), is obtained and the corresponding segmentation map $S_{n^*}$ is directly taken as the segmentation output for the input image 10 (or cropped image 18). This embodiment will be referred to as top-1 selection.

2. Top-K Pooling

In another embodiment, when the representation of $S_n$ is additive, then the K most similar entries in the database can be selected and the segmentation output for the image 10 (or cropped image 18) is taken as an optionally weighted average of these K samples, e.g., the initial segmentation map $(l_s, t_s, r_s, b_s)$ of the image computed in S210 (and similarly, the segmentation map 40 $(l_f, t_f, r_f, b_f)$ for cropped region 18 computed in S222) is computed as:

$$S = \frac{1}{K} \sum_{K_r=1}^{K} w_r S_r, \quad (5)$$

where r indicates the index of the entry with rank $K_r$, $S_r$ is its segmentation map, and $w_r$ is the weight assigned to this entry. This embodiment is referred to as top K pooling.

In one embodiment, $w_r$ is the value of the similarity computed according to Eqn. (1) between the projected image signature of the input image and the projected image signature for the entry with rank $K_r$, e.g., $w_r=k(x,x_r)$, or is a function thereof.

In one embodiment, the output segmentation map is associated with a confidence value which gives an estimate of its degree of correctness. In the case of the top-1 selection method, the similarity score of the most similar item $k(x,x_n^*)$ can be taken as the confidence. In the case of the top-K pooling, a suitable implementation combines the scores $w_r$, $K_r=1 \ldots K$ into a single score. Different choices for this combination are: the mean, the maximum and the minimum of the scores. If the confidence value does not meet a predetermined threshold, the method may end, on the assumption that the image is not sufficiently similar to any of the database images for the segmentation to be reliable. This image may be flagged for manual inspection in an otherwise automated process.

Segmenting the Image in the First and Second Stages (S210, S222)

The segmentation map $(l_s, t_s, r_s, b_s)$ generated from the top-1 or top-K images is applied to the input image at S210. For example, assuming the input image 10 has the same pixel dimensions as the retrieved similar image(s), the coordinates of the corners of the region of interest or of those pixels indexed as being in the region of interest are applied directly to the input image. In other embodiments, a factor is applied to the segmentation map to allow for differences in dimensions.

Where more than one segmentation map is retrieved in the top-K method, the mean of the segmentation maps can be used. In another embodiment, a weighted average of the segmentation maps is used, where the weight of each segmentation map may be a function of the computed similarity of the projected image signatures. In other embodiments, the minimum area of overlap of (or the maximum area covered by) the segmentation maps of the top-K images is used as a basis for the segmentation map applied to the image 10.

Similarly, segmentation map $(l_f, t_f, r_f, b_f)$ generated from the top-1 or top-K small images is applied to the cropped image 18 at S222. For example, assuming the cropped image 18 has the same pixel dimensions as the retrieved similar small image(s), the coordinates of the corners of the region of interest or of those pixels indexed as being in the region of interest are applied directly to the cropped image. In other embodiments, a factor is applied to the segmentation map to allow for differences in dimensions. Weighting/averaging methods analogous to those described for the input image (top-K pooling) can be used where more than one segmentation map is retrieved in the top-K method.

Images

Images 10, 12 may be received by the system 50 in any convenient file format, such as JPEG, GIF, JBIG, BMP, TIFF, or the like or other common file format used for images and which may optionally be converted to another suitable format prior to processing. Input images may be stored in data memory 66 during processing. The image 10 can be input from any suitable image source, such as a workstation, database, memory storage device, such as a disk, or the like. The images 10, 12 may be individual images, such as photographs, video images, text images, or combined images which include photographs along with text, and/or graphics, or the like. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). In some embodiments, the images may be monochrome (e.g., black and white) images or converted to monochrome prior to processing.

The images may be obtained from a camera, e.g., at a toll plaza or in a parking lot, in the case of vehicle identification. The small (and large) images may optionally be corrected for skew, for example, using the method of application Ser. No. 13/494,302.

Image Signatures

The signature 96, 98 generated by signature generator 94 for each image 10, 12, 18, 22 can be any suitable high level statistical representation of the respective image, such as a multidimensional vector generated based on features extracted from the image. Fisher Kernel representations and Bag-of-Visual-Word representations are exemplary of suitable high-level statistical representations which can be used herein as an image signature. The exemplary image signatures are of a fixed dimensionality, i.e., each image signature has the same number of elements. However, it is contemplated that the image signatures used in the second stage may be of a different, fixed dimensionality from those used in the first stage. In general, each image signature 96, 98 has at least 30, or at least 60, or at least 100, or at least 500 dimensions, and up to 1000 or more dimensions, each dimension having a respective feature value, which may be reduced to fewer dimensions if a projection matrix is employed.

For example, the signature generator 94 includes a patch extractor, which extracts and analyzes low level visual features of patches of the image 10, 12, 18, 22, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50 patches are extracted from each image.

The extracted low level features (e.g., in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image 10, 12, 18, 22 to be assigned a signature, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature or input to a generative model which outputs an image signature based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

The signatures for the query and database images (including full images and cropped regions) may be indexed or compressed using conventional techniques (locality sensitive hashing (LSH), product quantization, etc.) to speed up the process.

In some illustrative examples, a Fisher vector is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described U.S. Pub. No. 20120076401, published Mar. 29 2012, entitled IMAGE CLASSIFICATION EMPLOYING IMAGE VECTORS COMPRESSED USING VECTOR QUANTIZATION, by Jorge Sánchez, et al., U.S. Pub. No. 20120045134, published Feb. 23, 2012, entitled LARGE SCALE IMAGE CLASSIFICATION, by Florent Perronnin, et al., and in Jorge Sánchez, and Thomas Mensink, "Improving the fisher kernel for large-scale image classification," in Proc. 11$^{th}$ European Conference on Computer Vision (ECCV): Part IV, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

Other exemplary methods for computing image signatures are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739, and in F. Perronnin, J. Sánchez, and T. Mensink, "Improving the Fisher kernel for large-scale image classification," in ECCV 2010, and Jorge Sánchez and Florent Perronnin, "High-dimensional signature compression for large-scale image classification," in CVPR 2011.

As will be appreciated, since the cropped image 18 generally comprises a sub-set of the patches forming the input image 10, in some embodiments, the image signature for the cropped image 18, and similarly for the small images 22, may be generated from the descriptors generated for the relevant patches for the respective large image 10, 12.

Application to License Plates

In the exemplary embodiment, the image signatures may be computed according to the method described in Florent Perronnin, Jorge Sánchez, and Thomas Mensink, "Improving the fisher kernel for large-scale image classification," in ECCV 2010, pages 143-156, and in U.S. Pub. No. 20120045134. This signature may be referred to herein as an improved Fisher vectors (iFV) signature. The iFV signature is useful since in the signature generation method, the image-independent information (background) is approximately discarded from the Fisher vector signature, retaining primarily the image specific information (the license plate in this case). L2 normalization of each signature can be applied. This tends to reduce the dependence of the signature on the size of the foreground object of interest (the license plate in this case). Suitable parameters for the Fisher vectors, such as the number of Gaussians in the GMM, number of elements in the final vector, and so forth can be obtained through testing the method on test samples for which the ground truth segmentation is known. While larger numbers of Gaussians can increase the accuracy, the larger number also increases the computational cost.

Each segmentation map S can be represented as a set of four 2-dimensional points corresponding to the corners of a polygon which separates the plate number region from the background region, thus the segmentation map space: $S=\mathbb{R}^8$. ($\mathbb{R}$ is the set of real numbers from which the coordinates can be drawn). In other embodiments, only the coordinates of opposite corners are used. Thus the segmentation map space: $S=\mathbb{R}^4$.

The similarity between the segmentation maps can be expressed as the area overlap between the two polygons. The area overlap can be defined as $$\Psi(S, S') = \frac{\text{Area}(S \cap S')}{\text{Area}(S \cup S')},$$

i.e., the ratio of the area of the polygon intersection to the area of polygon union.

Since R is an additive space, it is convenient to use the "top K pooling" implementation.

Information can then be extracted from the segmented region, in this case, a license plate number.

The method thus can find use in automatic tolls. While the vehicle may have a tag which reports vehicle identification information, sometimes this may fail, and in this case the license plate information can be used to identify the vehicle and bill the owner automatically. Or, the tag may be eliminated entirely.

While the illustrated system and method is suited to license plate localization, it may also find application in vehicle localization, logo-spotting in documents, and other object localization tasks.

Use of Synthetic Training Data

While the exemplary training data is described in terms of actual photographs of license plates, it is also contemplated that some or all of the training data may be artificially generated. For example, the method for synthesizing license plate images described in above-mentioned U.S. application Ser. No. 13/300,124 may be used. In this method, a collection of license plate images is generated. The method allows a synthetic image to be generated for each valid character permutation of each license plate template offered by each issuing authority, or at least a substantial subset of these. Generating license plate images with a sufficient set of geometrical configurations could be a practical solution in absence of a training set or with only a relatively small number of training images.

Without intending to limit the scope of the exemplary embodiment, the following Example illustrates the application of the method to license plate image segmentation.

EXAMPLE

This example demonstrates the feasibility of the proposed approach in a real segmentation application, and illustrates the benefits of the similarity learning procedure.

A set of vehicle images captured by cameras positioned at various tooth booths on highways was obtained. A dataset of 4838 of these images was manually annotated with a bounding box 16 delimiting an area around the license plate. The bounding box was localized by the four coordinates (l,t,r,b) as described above. While the bounding box does not tightly fit the plate, it was a requirement for it to be smaller than twice the size of the plate.

A set of 3837 images obtained on one day was taken as the training set, and a set of 1001 images obtained the next day was taken as a test set. Validation experiments were performed with the training images in a leave-one-out fashion.

To generate the set of small images, each image in the training set was segmented using the exemplary method described above to generate a sub-image (small images) from each of the training images (large images).

The signature chosen to represent the images was the Fisher vector, using the same Fisher vector parameters as were used in the '038 application. Validation set results can be used to determine the best parameters for number of nearest neighbors to consider and learning rate of the similarity learning algorithm. The horizontal and vertical scaling factors $x_1=x_2$ and $y_1=y_2$ were 0.5 and 1, respectively.

The overlap between a ground-truth rectangle 16 for an image and an obtained rectangle 28 for the same image is computed as the area of the bounding box intersection divided by the area of the bounding box union. A query image is counted as correctly segmented if the bounding box obtained by the process overlaps with the true bounding box at least by 60%. It was verified that an overlap of 60% corresponds to an acceptable visual good estimation.

Table 1 below summarizes the results, showing the percentage of correctly segmented test images. The table compares the one step method of the '038 application, with the exemplary two stage (region re-focusing) method (both with and without projection learning). "Without projection" was performed using the dot product of the image signatures as the similarity measure.

TABLE 1

|  | No projection learning | With projection learning |
| --- | --- | --- |
| One-step method | 26.3% | 33.7% |
| Region re-focusing method | 76.1% | 81.6% |

It can be seen that the re-focusing step (second stage) of the exemplary method boosts segmentation accuracy considerably, both in the cases with and without any projection learning.

While in some cases, the most similar image(s) retrieved in the first stage produced a poor estimate of the target location, it was observed that the output bounding box generally tends to be within proximity of the true location. By expanding the bounding box with a constant factor horizontally and vertically (0.5 and 1 in the examples) to produce a cropped region 18, and repeating the method in the second stage, good localization was obtained. Thus, while the one stage data-driven object localization (segmentation) method is relatively poor at producing fine estimates of the target object location when using large images, it is good at producing a rough guess. While the rough guess may not be satisfactory for some applications (e.g., to apply license plate recognition software), it can be used to get an estimate of the object location, probably incorrect but close to the true target location; then the obtained bounding box is expanded by a constant factor, yielding a region likely containing the object but still too coarse, but when the localization method is re-run with the expanded region on a database of pre-generated regions to yield a refined estimate, good localization is achieved. The second data-driven object localization step computes the location of the object relative to the coarse region. This can be made relative to the original image yielding a 2-step method to find the small object accurately.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for segmenting an image comprising:
computing a first image signature for an input image;
identifying at least one similar image from a first set of images, based on the first image signature and image signatures of images in the first set of images;
generating a cropped region of the input image based on the identified at least one similar image;
computing a second image signature for the cropped region;
identifying at least one similar image from a second set of images, based on the second image signature and image signatures of images in the second set of images; and
segmenting the input image based on a segmentation map of at least one of the at least one similar image identified in the second set of images.

2. The method of claim 1, wherein at least one of the computing of the first and second image signatures, identifying of similar images from the first and second sets, generation of the cropped region, and segmenting the input image is performed with a computer processor.

3. The method of claim 1, further comprising estimating a segmented region of the input image based on a segmentation map of at least one of the at least one similar image in the first set of images and wherein the generating of the cropped region of the input image is based on the segmented region.

4. The method of claim 3, wherein the generating of the cropped region comprises generating a bounding box surrounding the segmented region which is larger in size than the segmented region.

5. The method of claim 3, wherein the generating of the cropped region of the input image comprises shifting horizontal and vertical coordinates of the segmented region as a function of a width and a height of the segmented region, respectively, and a respective scaling factor.

6. The method of claim 1, wherein the images in the second set of images are each derived by cropping an image in the first set of images.

7. The method of claim 1, wherein the segmenting of the input image comprises:
generating a second cropped region of the input image based on the cropped region;
computing a third image signature for the second cropped region; and
identifying at least one similar image from a third set of images, based on the third image signature and image signatures of images in the third set of images.

8. The method of claim 1, wherein the computing of the image signature for the input image comprises generating a multidimensional vector based on features extracted from patches of the image.

9. The method of claim 1, wherein the identifying at least one similar image from at least one of the first and second sets of images comprises identifying the top K most similar images from the at least one of the first and second sets of images, where K is greater than 1.

10. The method of claim 1, further comprising at least one of:
projecting the image signature of the image to be segmented into a feature space with a first learned projection matrix and wherein the identifying of the at least one similar image from the first set of images comprises computing a similarity between the projected image signature and projected image signatures of the images in the first set projected with the learned first projection matrix; and projecting the image signature of the cropped region into a feature space with a second learned projection matrix and wherein the identifying of the at least one similar image from the second set of images comprises computing a similarity between the projected image signature and projected image signatures of the images in the second set projected with the learned second projection matrix.

11. The method of claim 10, further comprising learning at least one of the first and second projection matrices using segmentation maps and image signatures of a set of training images.

12. The method of claim 11, wherein the learning of the at least one of the first and second projection matrices comprises:

for a plurality of iterations:
  drawing a triplet of entries from the set of training images, each entry comprising a segmentation map and an image signature for an image in the training set;
  computing a similarity between entries forming a first pair of the entries, based on their segmentation maps;
  computing a similarity between entries forming a second pair of the entries, based on their segmentation maps;
  generating a first ranking for the first and second pairs based on the computed segmentation map similarities;
  computing a similarity between the entries forming the first pair of entries, based on their image signatures projected with a current projection matrix;
  computing a similarity between the entries forming the second pair of entries, based on their image signatures projected with the current projection matrix;
  generating a second ranking for the first and second pairs based on the computed projected image signature similarities; and
  updating the current projection matrix if the first and second rankings do not agree; and
after the plurality of iterations, outputting the updated projection matrix as the projection matrix.

13. The method of claim 1, wherein at least one of:
the identifying of the at least one similar image from the first set of images is based on similarities between a projected image signature of the input image and projected image signatures of the images in the first set of images computed in a feature space in which similarities between projected image signatures of images in a first set of training images are more likely to correlate with similarities based on their segmentation maps than are computed similarities between the image signatures of the training images in the first set, prior to projection; and
the identifying of the at least one similar image from the second set of images is based on similarities between a projected image signature of the cropped image and projected image signatures of the images in the second set of images computed in a feature space in which similarities between projected image signatures of images in a second set of training images are more likely to correlate with similarities based on their segmentation maps than are computed similarities between the image signatures of the training images in the second set, prior to projection.

14. The method of claim 1, wherein the segmenting of the image comprises identifying a target region in one of the cropped region and the input image.

15. The method of claim 1, wherein the input image has an area which is at least twice an area of the cropped region.

16. The method of claim 1, wherein the generating of the image signature for the input image comprise generating a single global image signature for the input image and wherein the identifying of the at least one similar image from the set of images is based on the single global image signature.

17. The method of claim 1, wherein the first set of images comprises images of vehicles each including a license plate and the second set of images comprises images of license plates.

18. The method of claim 17, further comprising identifying a license plate number from a foreground region of the segmented input image.

19. The method of claim 1, wherein at least one of the first and second sets of images comprises synthesized images.

20. A computer program product comprising a non-transitory recording medium storing instructions, which when executed on a computer, causes the computer to perform the method of claim 1.

21. A system for image segmentation comprising memory which stores instructions for performing the method of claim 1 and a processor in communication with the memory for executing the instructions.

22. A system for image segmentation comprising:
memory which stores:
  a signature generator configured for generating:
    a first image signature for an input image to be segmented, and
    a second image signature for a cropped region of the input image;
  a retrieval component configured for identifying at least one first similar image from an associated first set of images, based on the first image signature and image signatures of images in the first set of images;
  a segmentation component configured for identifying a segmented region of the input image based on segmentation maps of the identified at least one similar image from the first set; and
  a cropping component configured for cropping the input image to generate the cropped region, based on the identified segmented region;
  the retrieval component being configured for identifying at least one second similar image from an associated second set of images, based on the second image signature and image signatures of images in the second set of images;
  the segmentation component being configured for segmenting the input image based on segmentation maps of the identified at least one second similar image from the second set; and
a processor which implements the signature generator, retrieval component, cropping component, and segmentation component.

23. The system of claim 22, further comprising a learned projection matrix for projecting at least one of the first and second image signatures into a different feature space, the projection matrix having been learned on projected image signatures of training images drawn from a set of training images and their respective segmentation maps.

24. A method for forming a system for image segmentation comprising:

providing a signature generator for generating a first image signature for an input image to be segmented and a second image signature for a cropped region of the input image;

learning a first projection matrix, for projecting the first image signature into a first feature space, using image signatures of images drawn from a first training set and their respective segmentation maps;

learning a second projection matrix, for projecting the second image signature into a second feature space, using image signatures of images drawn from a second training set and their respective segmentation maps;

providing a retrieval component for:

identifying at least one similar first image from a first set of images, similarity being computed based on the projected image signature of the input image and the projected image signatures of the images in the first set of images, the projected image signature of the input image being generated by projecting the input image's image signature with the first projection matrix, and identifying at least one similar second image from a second set of images, similarity being computed based on the projected image signature of the cropped region and the projected image signatures of the images in the second set of images, the projected image signature of the cropped region being generated by projecting the cropped region's image signature with the second projection matrix, the cropped region being generated based on the segmentation map of the identified at least one similar first image; and providing a segmentation component for segmenting the input image based on a segmentation map of at least one of the at least one similar second image.

25. A method for image segmentation comprising:

with a computer processor, cropping an input image to generate a cropped region of the input image, based on a computed similarity between a representation of the input image and representations of images in a first set of images for which respective segmentation maps are defined;

identifying a target region within the cropped region, based on a computed similarity between a representation of the cropped region and representations of images in a second set of images for which respective segmentation maps are defined, the images in the second set being each derived from a respective image in the first set by cropping.

* * * * *